J. C. TUTTLE.
METHOD OF MANUFACTURING TIRES.
APPLICATION FILED OCT. 7, 1919.
1,392,608.
Patented Oct. 4, 1921.
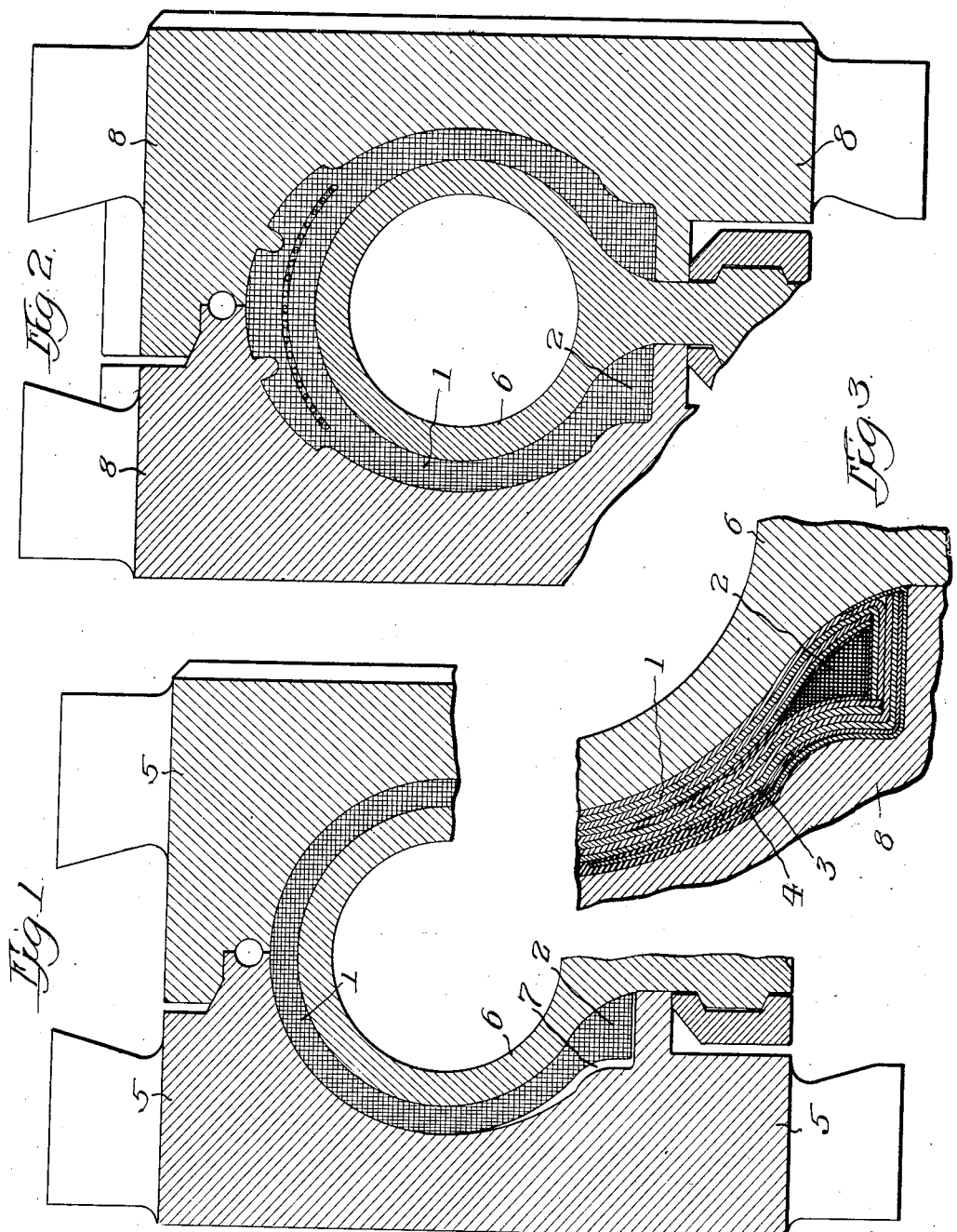
Witness:
Geo. C. Morison
Inventor:
John C. Tuttle,
By G. L. Ely
Atty.

UNITED STATES PATENT OFFICE.

JOHN C. TUTTLE, OF AKRON, OHIO, ASSIGNOR TO THE FIRESTONE TIRE AND RUBBER COMPANY, OF AKRON, OHIO, A CORPORATION OF OHIO.

METHOD OF MANUFACTURING TIRES.

1,392,608.   Specification of Letters Patent.   Patented Oct. 4, 1921.

Application filed October 7, 1919. Serial No. 328,964.

*To all whom it may concern:*

Be it known that I, JOHN C. TUTTLE, a citizen of the United States, residing at Akron, in the county of Summit, State of Ohio, have invented certain new and useful Improvements in Methods of Manufacturing Tires, of which the following is a specification.

This invention relates to a method of manufacturing tire casings and its object is to afford a simple and inexpensive means for obviating some of the difficulties now present in the curing of these articles.

As is well known in the art, the object to be obtained in the building of the casing or carcass is to apply the fabric layers or plies in such manner that the threads or cords will run in a true line from bead to bead without waves or wrinkles. A common method of securing this condition and of straightening out whatever waves may occur in the laying on of the plies consists in removing the green tire carcass from the rigid core upon which it has been built, and inserting an expansible tube or core within the tire. The tire is then placed in a mold somewhat larger than the tire placed therein and the core expanded so that the casing is stretched, it being the purpose of the expansion to straighten out such of the cords as are not in correct position.

The method outlined above is the one in most common use, to my knowledge, and while the function supposed to be performed by the air-bag or expansible core, may be carried out more or less satisfactorily, the use of these implements is attended with much expense and labor.

It is one of the purposes of this invention to cure the tire without the use of air bags or other expanding means for the tires, but to allow the tire to adjust itself in such manner during the curing process that the cords will be straightened out automatically. For this purpose I make use of a process by which the expansion and bow of rubber under heating will be utilized to straighten out any irregularities in the cords comprising the layers of the carcass.

In the drawings accompanying this application there is shown one of the embodiments of the process invented by me for carrying out the results set forth, it being understood that, having explained my invention in detail, other specific means may be devised for carrying out the invention.

In the drawings:

Figure 1 is a section through a mold showing my tire as it is placed in the mold for the first or semi-cure.

Fig. 2 is a similar section showing the final cure.

Fig. 3 is an enlarged section of a tire bead showing the construction and arrangement of the several plies over the bead, which view will make clearer the following description of the process.

In the method proposed by me, the tire casing is built up of the several layers of rubber coated fabric which compose the carcass in the usual manner. The layers of fabric are indicated by the numeral 1 and the beads by the numeral 2. When the carcass or fabric structure has been finished, it is usually the practice to apply a composite outside layer of rubber, comprising a cushion layer to go over the crown of the carcass and side walls which cover the sides of the carcass and extend down well toward the bead. Over the bead are placed one or more layers of lighter fabric covered with frictioned rubber known as chafer strips. Taking the present tire, as shown in Fig. 3, two chafer strips are provided which are shown at 3 and 4. If the tire is to be manufactured by the two cure process, it is now ready to be placed in the mold 5 on its core 6. If it is to be cured on an expansible core or air bag, the rigid core upon which it has been built is removed and the air bag put in place thereof.

It is at this point that my improved process deviates from present well known practices. In the particular embodiment of my invention herein shown, a certain portion of the side wall is omitted and the outer chafer strip is not applied. When the tire is placed in the mold 5, there will be a certain amount of space left within the mold cavity beginning at a point about the center line of the tire and extending to and around the bead. The showing of this space 7 in Fig. 1 is for the sake of making the invention clear and is not to be understood to be of exact dimensions as the space may be varied. Other means may be employed for obtaining a requisite amount of loose fit around the lower edges of the casing. The essential feature of the invention is that close contact of the walls of the mold is not obtained around the beads. As a result of this construction, when the mold is placed in the vulcanizer and heat is applied, the expansion of the rubber and its flow under heat and pressure finds a first and easy outlet toward the beads of the tire. The movement of the rubber stock toward the bases or beads of the tire will carry with it the fabric composing the carcass and it has been found that such movement will straighten out the wavy cords or threads in the layers comprising the carcass. As the wavy condition of the cords is almost entirely confined to that portion of the tire at the beads and lower side walls, the movement of the rubber downward will straighten all of the sinuous wavy condition found in the carcass and the first or semi-cure will fix the cords in their final position.

After the first cure the tire is removed from the mold 5 and buffed or roughened and cemented over its entire surface and the second chafer strip, the remainder of the side walls, the breaker and tread, are applied and the mold placed in a second core mold 8 and given its final cure. In this core the mold fits the outside of the tire and the pressure is applied to fully form the tire so that it is compressed and vulcanized under the usual pressure.

As a result of the process set forth in this application, the tire is formed without the usual wrinkles around the lower portion of the side walls and beads and the removal of any irregularities is performed by the curing operation without expensive equipment and without excessive labor.

The essential feature of this invention is the inducing of the flow of rubber during the first cure toward the beads of the tire so the movement of the stock will tend to remove the wavy condition of the fabric. Other methods may be devised for attaining this result and such methods are within the scope of this invention and covered hereby. The second or final cure may be given in any type of mold or by any method, as the fixing of the position of the cords is firmly well established in the first cure.

Modifications and changes of many kinds may be made in the process and such changes as do not depart from the essence of this invention are covered hereby.

I claim:

1. The method of manufacturing tires comprising the steps of forming a tire casing from fabric and rubber on a core, placing the tire in a mold, and causing the rubber under heat and pressure to flow toward the beads of the tire.

2. The method of manufacturing tires, comprising the steps of building a tire casing from fabric and rubber on a rigid core, placing the core and tire in a rigid mold, providing a space in the mold about the lower edges of the casing, and heating the tire in the mold.

3. The method of manufacturing tires, comprising the steps of building a tire casing from fabric and rubber on a rigid core, placing the core and tire in a mold, providing a space in the mold about the lower edges of the casing, heating the tire in the mold, removing and placing in a second mold adapted to fit the tire closely and curing the tire under pressure.

4. The method of manufacturing tires, comprising the steps of building a tire casing from fabric and rubber, placing the casing in a rigid mold which is so formed as to provide a space around the lower edges of the tire when they are assembled, giving the tire a preliminary vulcanization in the mold, and subsequently completing the vulcanization of the tire.

5. The method of manufacturing tires, comprising the steps of building a tire casing from fabric and rubber, placing the casing in a mold which is so formed as to provide a space around the lower edges of the tire when they are assembled, giving the tire a preliminary vulcanization in the mold, and subsequently completing the vulcanization of the tire in a second mold which will compress the tire about its lower edges.

6. A method of curing tires so as to remove wavy lines in the fabric comprising curing the tires and causing the rubber to flow toward the bead lines of the tire so that the lower edges of the fabric will be straightened out.

7. A method of vulcanizing tires so as to remove wavy lines in the fabric composing the carcass, comprising partially curing the tires and causing the rubber to flow toward the beads of the tire and finally curing under pressure.

8. A method of vulcanizing tires, comprising assembling the tire for curing with an area of compression about the tire which decreases toward the beads of the tire, whereby the flow of rubber during vulcanization is induced toward the beads of the tire.

9. A method of vulcanizing tires, comprising assembling the tire for curing with an area of compression about the tire which decreases toward the bead lines, whereby the flow of rubber during vulcanization is induced toward the beads of the tire, and afterwards curing said tire with increased compression at the beads.

JOHN C. TUTTLE.